US008755306B1

(12) United States Patent
Chhabra

(10) Patent No.: US 8,755,306 B1
(45) Date of Patent: *Jun. 17, 2014

(54) SIMPLIFIED AUTO-CONFIGURATION AND SERVICE DISCOVERY IN 802.11 AD-HOC NETWORKS

(75) Inventor: Kapil Chhabra, Milpitas, CA (US)

(73) Assignee: Marvell World Trade Ltd., St. Michael (BB)

( * ) Notice: Subject to any disclaimer, the term of this patent is extended or adjusted under 35 U.S.C. 154(b) by 519 days.

This patent is subject to a terminal disclaimer.

(21) Appl. No.: 12/952,061

(22) Filed: Nov. 22, 2010

Related U.S. Application Data

(63) Continuation of application No. 11/944,980, filed on Nov. 26, 2007, now Pat. No. 7,848,263.

(60) Provisional application No. 60/867,495, filed on Nov. 28, 2006.

(51) Int. Cl.
*H04L 12/28* (2006.01)

(52) U.S. Cl.
USPC .......................... 370/255; 370/254; 370/395.3

(58) Field of Classification Search
USPC ....................................... 370/254, 255, 395.3
See application file for complete search history.

(56) References Cited

U.S. PATENT DOCUMENTS

| | | | |
|---|---|---|---|
| 5,185,860 A | 2/1993 | Wu | |
| 6,101,499 A | 8/2000 | Ford et al. | |
| 7,152,099 B1 | 12/2006 | Arens | |
| 7,782,845 B2 * | 8/2010 | Bomhoff et al. | ............... 370/389 |
| 2003/0177220 A1 | 9/2003 | Ohara | |
| 2004/0122974 A1 | 6/2004 | Murakami | |
| 2005/0122934 A1 | 6/2005 | Fujita | |
| 2005/0138428 A1 | 6/2005 | McAllen et al. | |
| 2006/0251004 A1 | 11/2006 | Zhong et al. | |
| 2010/0054154 A1 | 3/2010 | Lambert et al. | |

FOREIGN PATENT DOCUMENTS

| | | | |
|---|---|---|---|
| CN | 1671114 A | * | 9/2005 |
| EP | 1 659 762 A1 | | 5/2006 |

OTHER PUBLICATIONS

Zhang, Machine Translation of CN167114A, Sep. 2005.*
Bonjour: Connect computers and electronic devices automatically, without any configuration; Apr. 2005.
Kapil Chhabra, 802.1 I Service Discovery Protocol Specification—Draft Version 0.1, Dec. 17, 2005.
Taiwanese Office Action and Search Report issued Nov. 18, 2013 in Patent Application No. 096145222 (with English language translation).

* cited by examiner

*Primary Examiner* — Dang Ton
*Assistant Examiner* — Robert M Morlan

(57) ABSTRACT

An ad-hoc network approach for addressing ad-hoc network address assignment, name resolution, and service discovery in ad-hoc networks. The size of the ad-hoc network may be limited to a selected number of ad-hoc network stations. A first portion of the ad-hoc network address assigned to stations joining the ad-hoc network may be fixed and a second portion of the ad-hoc network address may be selected dynamically, as each new station joins the ad-hoc network. A station may generate an information element that may be included in ad-hoc network messages. An exemplary information element may include a last byte of the ad-hoc network address associated with the transmitting station, a 4-byte timestamp field which indicates a number of milliseconds since the station claimed the network address, a user-friendly name to identify the station, a universally unique identifier (UUID) for each service offered by the transmitting station, and a network-address-in-use bitmap.

20 Claims, 11 Drawing Sheets

SIMPLIFIED AUTO-CONFIGURATION AND SERVICE DISCOVERY IN 802.11 AD-HOC NETWORKS

INCORPORATION BY REFERENCE

This application is a continuation of U.S. patent application Ser. No. 11/944,980, filed on Nov. 26, 2007, which claims the benefit of U.S. Provisional Application No. 60/867,495, filed on Nov. 28, 2006, which is incorporated in its entirety by reference herein.

BACKGROUND

Over the past few years, consumers have embraced digital technology. Consumer acceptance has been driven by the availability of services such as high-speed links to the Internet, wired and wireless home networks, and the growth of digital cafés offering a variety of opportunities for social interaction and services. Consumer acceptance has also been driven by the availability of a wide range of digital technology products such as laptop computers, hand-held computers, digital cell phones, video and audio recording and/or playback devices. The widespread acceptance and use of digital technologies has led to a high demand for seamless, transparent connectivity, communication and interoperability between the respective digital devices, and between the respective digital devices and available services that enhance the usefulness of the respective digital devices and/or facilitate their use.

The ability to organize wireless electronic devices into ad-hoc wireless networks holds promise for meeting user demands for seamless, transparent connectivity and interoperability between digital devices and between digital devices and available services. However, existing ad-hoc network implementations are overly complex and burdensome and fall short of meeting user needs. Existing ad-hoc networks, e.g., such as ad-hoc networks based on the IEEE 802.11 standard, require a level of complexity that increases device processing and memory requirements, increases device production costs, and decreases operational efficiency. Thus, a need exists for approaches for implementing ad-hoc networks between wireless digital devices that provide seamless, transparent connectivity and interoperability between digital devices and available services, yet reduce device hardware requirements, reduce device complexity and production costs, and improve operational efficiency.

SUMMARY

The ad-hoc network approach described below addresses network address assignment, name resolution and service discovery in ad-hoc networks. In exemplary embodiments of the described ad-hoc network approach, the size of the ad-hoc network may be reduced below a size that could otherwise be supported by a selected address format, e.g., a 4 byte IP address format, a 6 byte address format, etc. For example, assuming that no more than 256 stations are desired in an ad-hoc network that is based on a four byte network address format, a first portion, e.g., the first three bytes, of network addresses assigned to stations joining the ad-hoc network may be fixed by design. A second portion, e.g., the fourth or last byte, of the network addresses may be selected dynamically, as each new station joins the ad-hoc network, respectively. In other exemplary embodiments of the described ad-hoc network approach, the maximum number of stations allowed to join an ad-hoc network may be increased to a number greater that 256, or reduced to a number less than 256. In such embodiments, the number of bits fixed in the address first portion, and the number of bits dynamically selected in the address second portion may be adjusted to support the maximum number of stations allowed to join the ad-hoc network at any one time.

Exemplary embodiments of a station that supports the described ad-hoc network approach may generate an information element that may be included in ad-hoc network messages, e.g., beacons, probe-requests and/or probe-responses, that are generated and broadcast to surrounding wireless devices. An exemplary information element may include: (1) a last byte of the ad-hoc network address, e.g., an ad-hoc IP network address, associated with the transmitting station; (2) a 4-byte timestamp field which indicates a number of milliseconds since the station claimed the network address; (3) a user-friendly name to identify the station; (4) a universally unique identifier (UUID) for each service offered by the transmitting station; and (5) a network-address-in-use bitmap, as addressed in greater detail below.

A station, or local station, in the ad-hoc network may maintain a local data store that may contain for each other station, or peer station, in the ad-hoc network, an ad-hoc network address, e.g., an ad-hoc IP network address, a user-friendly name, and UUID for each service offered by the peer station. A station may learn about peer station ad-hoc network addresses, names and services from respective received messages, e.g., beacons, probe-requests, and/or probe-responses. Data store entries within a station's local data store may use a peer station's MAC address as a primary key. An entry for a peer station within a station's local data store may expire and may be deleted from the station's local data store if a message, e.g., a beacon, probe-request and/or probe-response is not received from the corresponding peer station within a configurable time duration.

Stations configured to support embodiments of the described ad-hoc network may synchronize their local clocks based on timestamp information included within received messages. For example, each station may be configured to update its local clock based on timestamp information included in a received message whenever the received timestamp data is greater than its own clock value. In this manner, peer stations within the ad-hoc network may synchronize their respective local clocks, and may thereby synchronize their respective actions.

For example, a first station within a newly formed ad-hoc network may define a target beacon transmission time (TBTT) that reoccurs every TBTT interval, e.g., 100 ms. The TBTT and TBTT interval may be controlled by control parameters that are adopted by each new station as it joins the network. By synchronizing their respective clocks, as described above, each TBTT may occur simultaneously within each of the respective stations.

Further, stations within exemplary embodiments of the described ad-hoc network may be configured with a pre-TBTT timer that expires prior to each TBTT. On expiration of a pre-TBTT timer, each station may parse its local data store and may generate a network-address-in-use bitmap that indicates whether network addresses within an available set of network addresses are allocated or unallocated by peer stations in the ad-hoc network. For instance, if network address 169.254.1.10 is used by a peer station, bit 10 of the network-address-in-use bitmap may be set to 1, otherwise, bit 10 of the network-address-in-use bitmap may be set to 0. Assuming the ad-hoc network is limited to 256 or less stations, the network-address-in-use bitmap may be 256 bits in length. However, if the maximum number of stations allowed to join an ad-hoc network were to be increased to a number greater that 256, or reduced to a number less than 256, the number of bits in the network-address-in-use bitmap may be adjusted accordingly.

The network-address-in-use bitmap may be included in outgoing ad-hoc network messages. Regardless of the size of the network-address-in-use bitmap, the bitmap may be compressed to reduce the size of the bitmap prior to transmission in an ad-hoc message. The network-address-in-use bitmap may be reduced in size using any desired size reduction and/or compression technique. For example, stations may be configured to choose the lowest network address available to reduce the number of bits required to identify the set of allocated network addresses and unnecessary bits may be truncated.

A station interested in auto-configuring itself with a network address may use a peer station's network-address-in-use bitmap and may choose an address that is not in use. After choosing a network address, the station may attempt to send out a beacon or an unsolicited probe-response following the next TBTT, and/or following a predetermined number, e.g., 2, 3, 4, or any other predetermined integer N, of subsequent TBTT(s). The beacon/probe-response may contain the information element, described above, and may be used to announce a station's newly allocated network address, user-friendly name, and list of service the station may provide, so that peer stations may update their respective data stores.

Using such an approach, there remains a possibility that two stations may choose the same network address at the same time or that two stations may select the same network address based on received network-address bitmaps that contain obsolete information. Such a conflict may be detected when a station hears a network address in a message received from a peer station that matches it's own local network address. In such a scenario, the station may use the 4-byte timestamp, included in the message received from the peer station, to unambiguously decide which station should retain the right to use the address. In one exemplary embodiment, a station with an older timestamp may continue to use the same network address while a station with a more recent timestamp may parse one or more of the network-address-in-use bitmaps stored in its local data store to choose a different network address.

The described approach allows an ad-hoc network station to discover services available from other stations within the network. For example, a station may send a probe-request containing an information element bearing a user-friendly name and/or list of services the querying station is interested in. In response to a received probe-request, a peer ad-hoc station may parse its local data store and may respond if it locates information that would be responsive to the received probe-request message. In one exemplary embodiment, a querying station may issue a probe-request message a predetermined number, e.g., 2, 3, 4, or any other predetermined integer N, before deciding that a desired name/service is unavailable on the network.

BRIEF DESCRIPTION OF THE DRAWINGS

Exemplary embodiments of an ad-hoc wireless network that supports simplified auto-configuration and service discovery in ad-hoc networks will be described with reference to the following drawings, wherein like numerals designate like elements, and wherein.

DETAILED DESCRIPTION OF EMBODIMENTS

Figure 1:
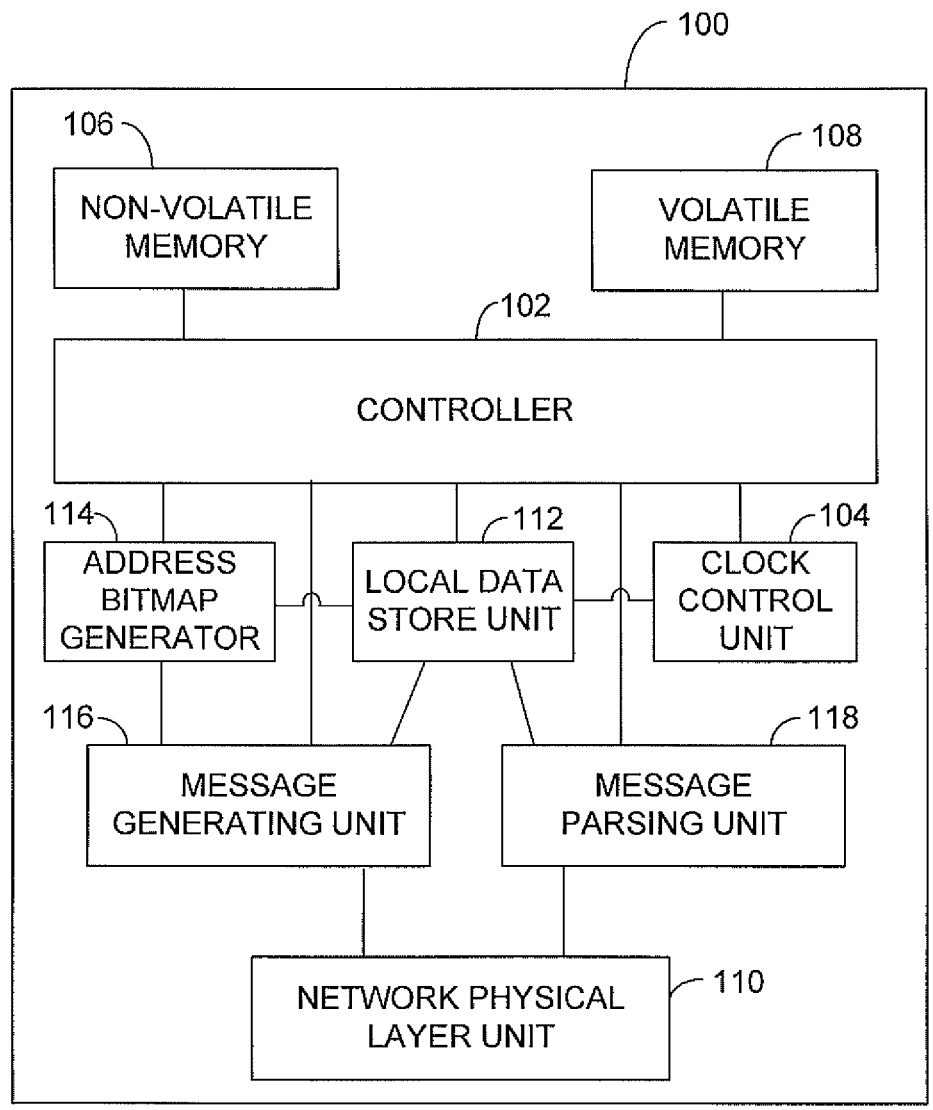
FIG. 1 is a block level diagram of an exemplary wireless device, or station, that supports simplified auto-configuration and service discovery in ad-hoc networks.

FIG. 1 is a block level diagram of an exemplary wireless device, or station, that supports simplified auto-configuration and service discovery in ad-hoc networks. As shown in FIG. 1, a station 100 may include a controller 102 in communication with a clock control unit 104, non-volatile memory 106, volatile memory 108 and a network physical layer unit 110. In addition, station 100 may include and controller 102 may communicate with a local data store unit 112, an address bitmap generator 114, a message generating unit 116, and a message parsing unit 118.

The features included within station 100 may be integrated within one or more user electronic devices such as a desktop or laptop computer, cell phone, digital camera, scanner, printer, plotter, or any other electronic device, thereby allowing the respective electronic devices to support formation of an ad-hoc network that provides seamless, transparent connectivity between the respective electronic devices.

For example, in one embodiment, functions performed by network physical layer unit 110, e.g., layer 1, or physical layer, of the Open System Interconnection (OSI) model, may be performed, by a network interface card (NIC) added to an electronic device, or by a physical layer unit embedded with an electronic device's circuitry. Functions performed by controller 102, and subsequent layers of the OSI model, or other network communication model, may be performed by software executed, for example, by a general microprocessor in electronic devices such as a desktop or a laptop computer, or may be executed, for example, by a separate processor in electronic devices such as printers, digital cameras, and scanners.

Controller 102 may control processing related to the receipt and transmission of messages across network physical layer unit 110 in accordance with existing ad-hoc network standards, such as the ad-hoc network standard described in IEEE 802.11, but modified as described in greater detail below, to support simplified auto-configuration and service discovery. Volatile memory 108, may allow the controller 102 to store program instructions in local memory for execution and to store and maintain temporary variables necessary for execution of the stored program instructions. Non-volatile memory 106, may allow controller 102 to access and retrieve larger bodies of data and program instructions for later execution by the controller. Exemplary processes executed as a result of the execution of such instructions are addressed below with respect to FIGS. 6 through 12.

Clock control unit 104 may control a local oscillator, or clock, and may provide controller 102 with a clock which may be used by controller 102 to schedule actions for execution. For example, controller 102 may set/update a time maintained by clock control unit 104 based on messages received via an ad-hoc network that station 100 has joined. For example, should the station receive a message with an Independent Basic Service Set (IBSS) timestamp greater that the time maintained by the station, controller 102 may instruct clock control unit 104 to update the time maintained by clock control unit 104 based on the received IBSS timestamp. Further, controller 102 may provide clock control unit 104 with a TBTT, a TBTT interval, and a pre-TBTT interval retrieved, for example, from non-volatile memory 106. Thereafter, clock control unit 104 may provide notifications to controller 102 when each pre-TBTT and TBTT event occurs based on the synchronized clock time.

Local data store unit 112 may build and maintain a local data store with information about peer stations in the ad-hoc network that the station has joined, based on information included in received messages, e.g., beacons, probe-requests and/or probe-responses. For example, information maintained in local data store unit 112 may include for each peer station in the ad-hoc network, a network address, a user-friendly name, and UUID for each service offered by the peer station. Data store entries may use a peer station's MAC address as a primary key in the local data store. The local data store may also be configured to include information about the local station, e.g., the local station's selected network address, user-friendly name, and UUID for each service offered by the local station. Table 1 provides a summary of information items that may be included within a record within a station's local data store. Information stored in the local data store by local data store unit 112 may be received from controller 102, and/or directly from other units such as message parsing unit 118, message generating unit 116, clock control unit 104, and address bitmap generator 114.

TABLE 1

Exemplary Station Local Data Store Record Description

| | CONTENT ITEM | DESCRIPTION |
|---|---|---|
| 1 | MAC Address | MAC address of peer station to which information described in the fields below pertains |
| 2 | IBSS Timestamp | IBSS clock synchronization timestamp included in last message received from the identified peer station |
| 3 | A selected second portion, e.g., a last byte, of local network address | A selected second portion of the peer station's selected network address |
| 4 | 4-byte timestamp | Number of milliseconds since the peer station selected its selected network address |
| 5 | User-friendly name | User-friendly name that may be used to identify the peer station |
| 6 | Offered Service UUIDs | A list of UUID's; an UUID for each service supported by the peer station |
| 7 | network-address-in-use bitmap | Bitmap identifying which of the available network addresses within a predetermined set of network addresses have been allocated |

Message parsing unit 118 may receive a message from network physical layer unit 110 and may parse the received message content to retrieve data that may be passed to controller 102 and/or local data store 112. For example, message parsing unit 118 may parse a received message to obtain the MAC address, IBSS timestamp and other information from the message header, and may parse and retrieve information contained within the message such as the information element containing information that supports simplified auto-configuration and service discovery, as addressed in greater detail below. Information retrieved from a received message may be passed to controller 102 for further processing and decision making and/or portions of the retrieved information may be passed directly to local data store unit 112 for generating updates to the local data store. Further, controller 102 may instruct local data store unit 112 to update information stored in the local data store based on peer station information received from message parsing unit 118. An entry for a peer station within a station's local data store may expire and may be deleted from the station's local data store if a message, e.g., a beacon, probe-request and/or probe-response is not received from the corresponding peer station within a configurable time duration, e.g. 5 minutes.

Table 2 below, is a summary of information items that may be included within an exemplary information element included within a transmitted message generated by a station that supports simplified auto-configuration and service discovery in ad-hoc networks.

TABLE 2

Exemplary Information Element Content Items

| | CONTENT ITEM | DESCRIPTION |
|---|---|---|
| 1 | A selected second portion, e.g., a last byte, of local network address | A selected second portion of the peer station's selected network address |
| 2 | 4-byte timestamp | Number of milliseconds since the peer station selected its selected network address |
| 3 | User-friendly name | User-friendly name that may be used to identify the peer station |
| 4 | Offered Service UUIDs | A list of UUID's; e.g., one UUID for each service supported by the peer station |
| 5 | network address-in-use bitmap | Bitmap identifying which of the available network addresses within a predetermined set of network addresses have been allocated |

Message generating unit 116 may, at the instruction of controller 102, generate an ad-hoc message for transmission to stations within radio broadcast range. The generated message may be one of a beacon message, probe-request, probe-response, or other message, as described in greater detail below. For example, upon being instructed by controller 102 of the type of message to be generated, message generating unit 116 may retrieve current station information and generate an information element containing, but not limited to, the content items as shown in Table 2. Further, based on the type of message to be generated, e.g., beacon message, probe-request, probe-response, etc., message generating unit 116 may receive additional information from controller 102 and/or may request additional information from local data store unit 112 and/or address bitmap generator 114, as addressed in greater detail below. Once the message is generated, message generating unit 116 may send the message to network physical layer unit 110 for transmission.

Address bitmap generator 114 may, based on a request from either controller 102 or message generating unit 116, contact local data store unit 112 to retrieve network-address information received from each peer station represented in the local data store. Address bitmap generator 114 may generate a network-address-in-use bitmap that may be used to record which network addresses, within a predetermined set of allowed network addresses in the ad-hoc network, have been allocated to stations within the ad-hoc network. For example, if network address 169.254.1.4, network address 169.254.1.87 and network address 169.254.1.235 are used by three stations forming an ad-hoc network, bits 4, 87 and 235 of the network-address-in-use bitmap may be set to 1. As addressed above, the network-address-in-use bitmap may be included in the information element included in outgoing messages. As described in greater detail below, messages containing the network-address-in-use bitmap may be monitored by stations interested in auto-configuring themselves to join the ad-hoc network. For example, based on the network-addresses indicated as allocated in the network-address-in-use bitmap, a station may, as part of the auto-configuration process, assign itself one of the network addresses that has not been allocated.

The network-address-in-use bitmap may be compressed to reduce the size of the transmitted bitmap. For example, stations may be configured to choose the lowest network address available to reduce the number of bits required to identify the set of network addresses in use. In such an approach, the bitmap could be reduced to the number of bits that have been allocated. In another approach, the network-address-in-use bitmap could be compressed by any algorithm that results in a reduced number of transmitted bits by, for example, the use of run-length coding, i.e., representing groups of zeros and/or groups of ones with a reduced number of bits.

As addressed in greater detail below, a station interested in auto-configuring itself with a network address may use a peer station's network-address-in-use bitmap to choose an address that is not in use. Further, a station may parse a plurality of network-address-in-use bitmaps stored in the station's local data store and may select a network address that is indicated as unallocated in each of the stored network-address-in-use bitmaps. After choosing a network address, the station may attempt to broadcast its new network address to peer stations in the ad hoc network by sending out a beacon or an unsolicited probe-response following the next TBTT, and/or following a predetermined number, e.g., 2, 3, 4, or any other predetermined integer N, of subsequent TBTT(s). For example, to increase the likelihood that the station will be successful in transmitting a beacon or an unsolicited probe-response after choosing a network address, the station may reduce it's beacon contention window for the next N TBTT(s). The beacon/probe-response may contain the information element described above, and may be used to announce the station's newly allocated network address, user-friendly name, and the services the station supports, so that peer stations may update their respective data stores.

Figure 2:
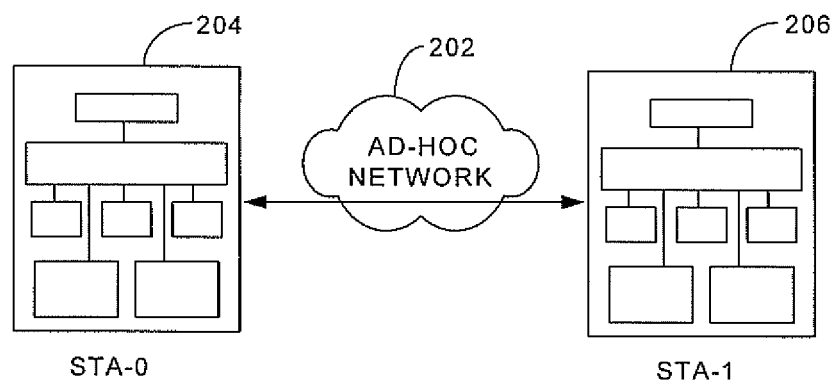
FIG. 2 is a schematic diagram of an exemplary ad-hoc network formed by two stations, such as the station presented in FIG. 1.

FIG. 2 is a schematic diagram of an exemplary ad-hoc network formed by two stations. As shown in FIG. 2, an ad-hoc network 202 may be formed between two stations, station STA-0, shown at 204, and station STA-1, shown at 206. Each of stations STA-0 and STA-1 may support simplified auto-configuration and service discovery in ad-hoc networks and may include the exemplary features and characteristics describe above with respect to FIG. 1.

Figure 3:
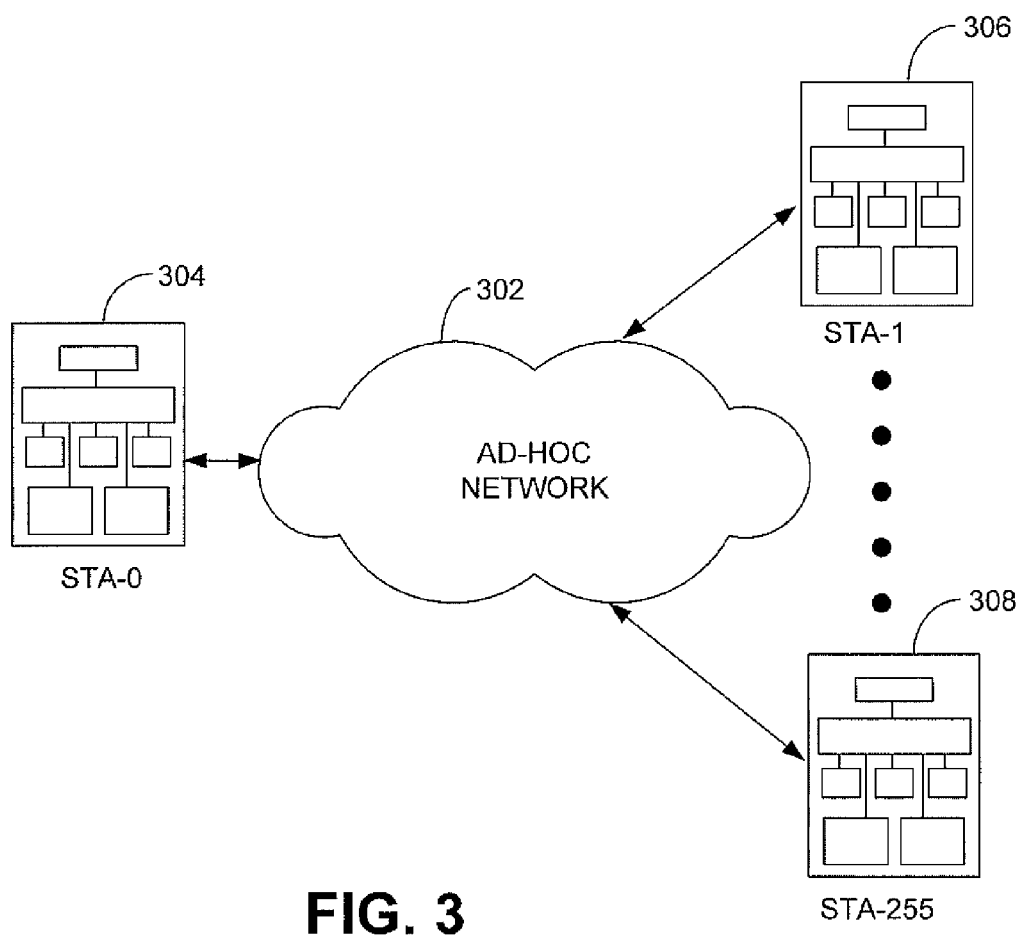
FIG. 3 is a schematic diagram of an exemplary ad-hoc network formed by a predetermined number of stations, e.g., 256.

FIG. 3 is a schematic diagram of an exemplary ad-hoc network that may include up to a predetermined number of stations, e.g., up to 256 concurrently connected stations. In such an exemplary ad-hoc network, assuming that a 4-byte network address is used, station hardware and processing requirements associated with forming the ad-hoc network may be greatly reduced by pre-configuring the first three bytes of each station's network address, as described above. However, such an approach may limit the number of concurrently connected ad-hoc network stations, e.g., a maximum of 256 stations, because the fourth byte of the network address may be configured with a maximum of 256 unique values, i.e., 0 through 255.

As shown in FIG. 3, an ad-hoc network 302 may be formed between as many as 256 stations, e.g., station STA-0, shown at 304, station STA-1, shown at 306 and as many as 254 additional stations, represented by dots in FIG. 3 leading to station STA-255 shown at 308. Each of stations STA-0 through STA-255 may support simplified auto-configuration and service discovery in ad-hoc networks and may include the exemplary features and characteristics described above with respect to FIG. 1.

Figure 4:
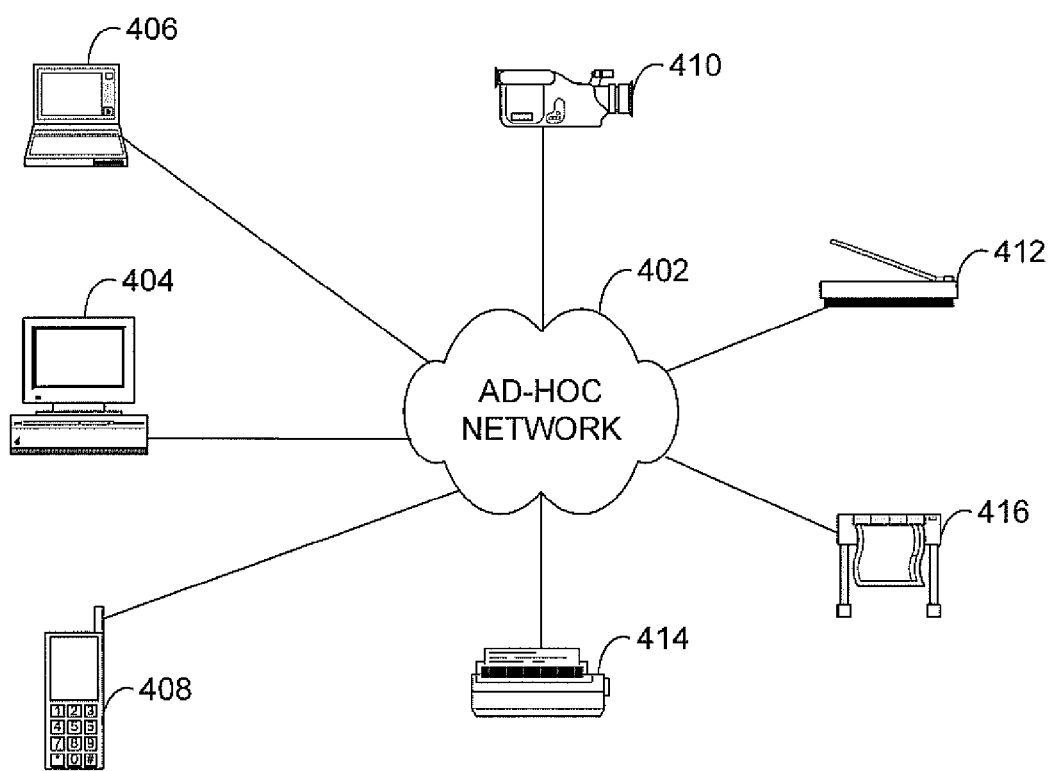
FIG. 4 is a schematic diagram of an exemplary ad-hoc network formed by exemplary stations within a home or small office environment.

FIG. 4 is a schematic diagram of an exemplary ad-hoc network 402 formed by exemplary stations within a standalone home or small office environment. For example, as shown in FIG. 4, exemplary ad-hoc network 402 may be used to provide seamless connectivity between such electronic devices as desktop computer 404, laptop computer 406, cell phone 408, digital camera 410, scanner 412, printer 414, and plotter 416. By reducing the number of stations associated with an ad-hoc network, processing and memory requirements associated with providing such an ad-hoc network are reduced. As a result, the described approach may be incorporated within such devices to provide seamless connectivity between such electronic devices having reduced processing and memory capabilities.

Although the described ad-hoc network approach may limit the number of stations that may join the ad-hoc network, the connectivity provided to stations within the ad-hoc network is not reduced. The described approach reduces hardware and processing requirements associated with providing such connectivity, thereby allowing more electronic devices to be cost effectively configured to support such connectivity.

Figure 5:
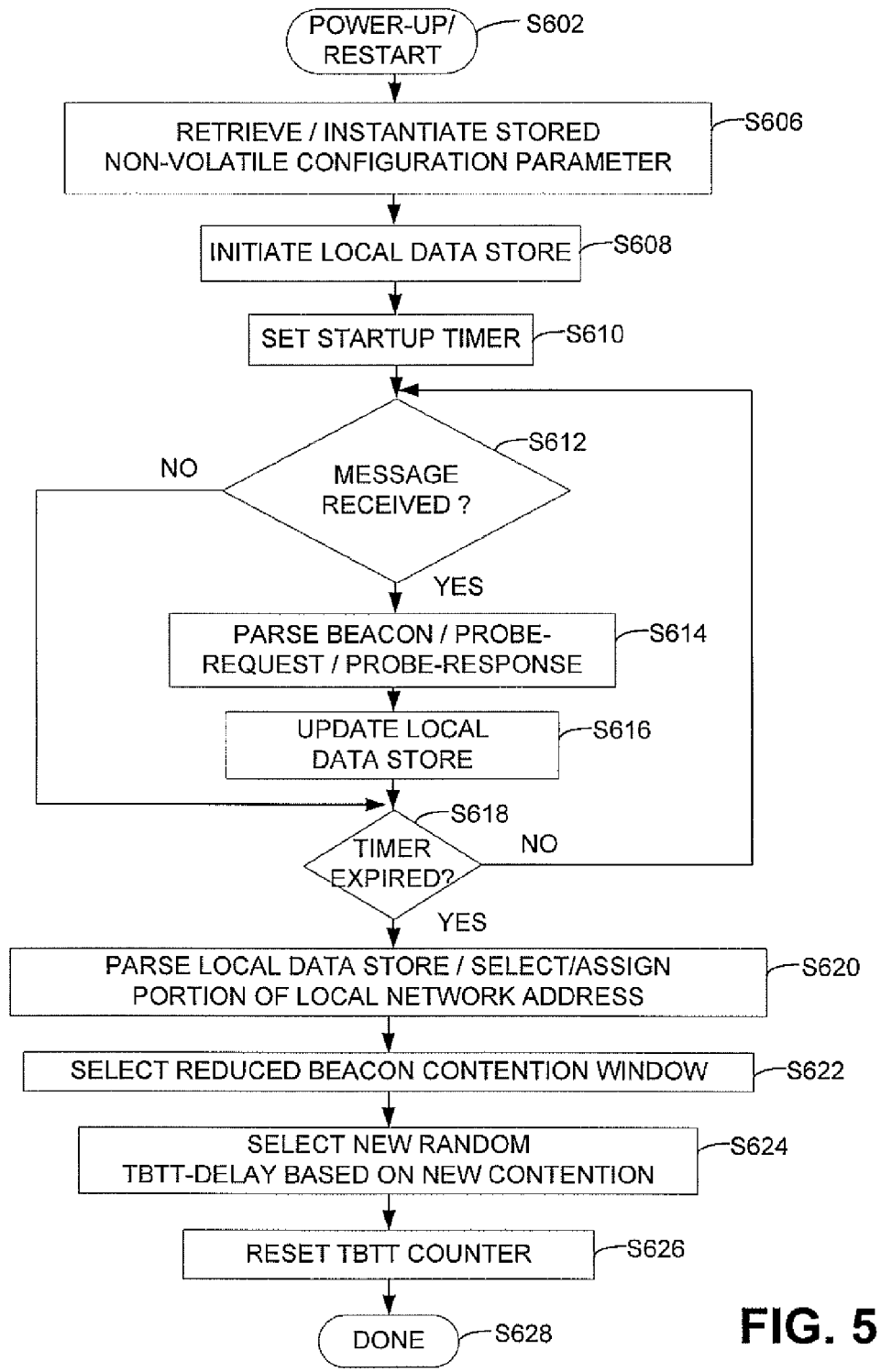
FIG. 5 is a flow diagram of an exemplary startup process executed by a station that supports simplified auto-configuration and service discovery in ad-hoc networks.

FIG. 5 is a flow diagram of an exemplary startup process executed by a station that supports simplified auto-configuration and service discovery in an ad-hoc network. As shown in FIG. 5, operation of the process may begin at step S602 with a power-up or processor restart of the station and processing proceeds to step S606.

In step S606, controller 102 may retrieve from non-volatile memory 106 stored control parameters used for control of the station, and processing proceeds to step S608.

In step S608, controller 102 may instruct local data store unit 112 to initiate a local data store, as described above with respect to Table 1. Although no messages from peer ad-hoc stations may have been received, the local data store may be updated to include an entry for the station that may be populated with default control parameters retrieved from non-volatile memory. Such parameters may include UUID's of services that may be provided by the station, the first three bytes of a network address assigned to the station, a user-friendly name assigned to the station, etc., and processing proceeds to step S610. The controller may also retrieve from non-volatile memory additional control parameters related to the station's control and operation of an ad-hoc network connection. For example, such control parameters may include, an assigned MAC address, a default TBTT, a default pre-TBTT time offset, a default IBSS beacon contention window, etc.

In step S610, controller 110 may instruct clock control unit 104 to initiate a startup timer for a predetermined period of time, e.g., 30 seconds, and processing proceeds to step S612.

In step S612, the controller determines whether an ad-hoc message has been received from another compatible device.

If a message has been received, processing proceeds to step S614, otherwise processing proceeds to step S618.

In step S614, the message parsing unit 118 parses the incoming message and may provide retrieved information, e.g., MAC address, IBSS timestamp, information element contents, etc., to the controller 102 and/or to local data store unit 112, and processing proceeds to step S616.

In step S616, local data store unit 112 may update the local data store to include the newly received information. For example, if the message is received from a station from which a message has previously been received and stored in the local data store, an existing record in the local data store may be updated. However, if the message was received from a station from which a message has not previously been received, a new record in the local data store may be created, as described above with respect to Table 1, and processing proceeds to step S618.

In step S618, controller 102 determines whether the previously set startup period timer has expired. If the timer has expired, processing proceeds to step S620. If the startup period has not expired, processing returns to step S612.

In step S620, controller 102 may instruct address bitmap generator 114 to parse the local data store and to generate a network-address-in-use bitmap. Based on the generated network-address-in-use bitmap, controller 102 may select a fourth network address byte and may combine the selected fourth byte with the first three network address bytes assigned to the station. In this manner, the station may assign itself an available network address, and processing proceeds to step S622.

In step S622, controller 102 may set a beacon contention window that is shorter in duration than the default IBSS beacon contention window, and processing proceeds to step S624.

In step S624, controller 102 may select a new random TBTT-delay based on the shortened beacon contention window, and processing proceeds to step S626.

In step S626, controller 102 may set/reset a TBTT counter to zero and the process may terminate at step S628.

In steps S622 through S626 described above, the controller reduces its beacon contention window in order to increase the likelihood that it will be allowed to transmit a beacon at an upcoming TBTT. For example, decreasing the beacon contention window increases the probability that the random TBTT-delay, generated in step S624, will be shorter than the random TBTT-delay generated by another station. This increases the likelihood that the station will be allowed to transmit its beacon message at the next TBTT, as described in greater detail with respect to FIG. 6 and FIG. 7, below.

Figure 6:
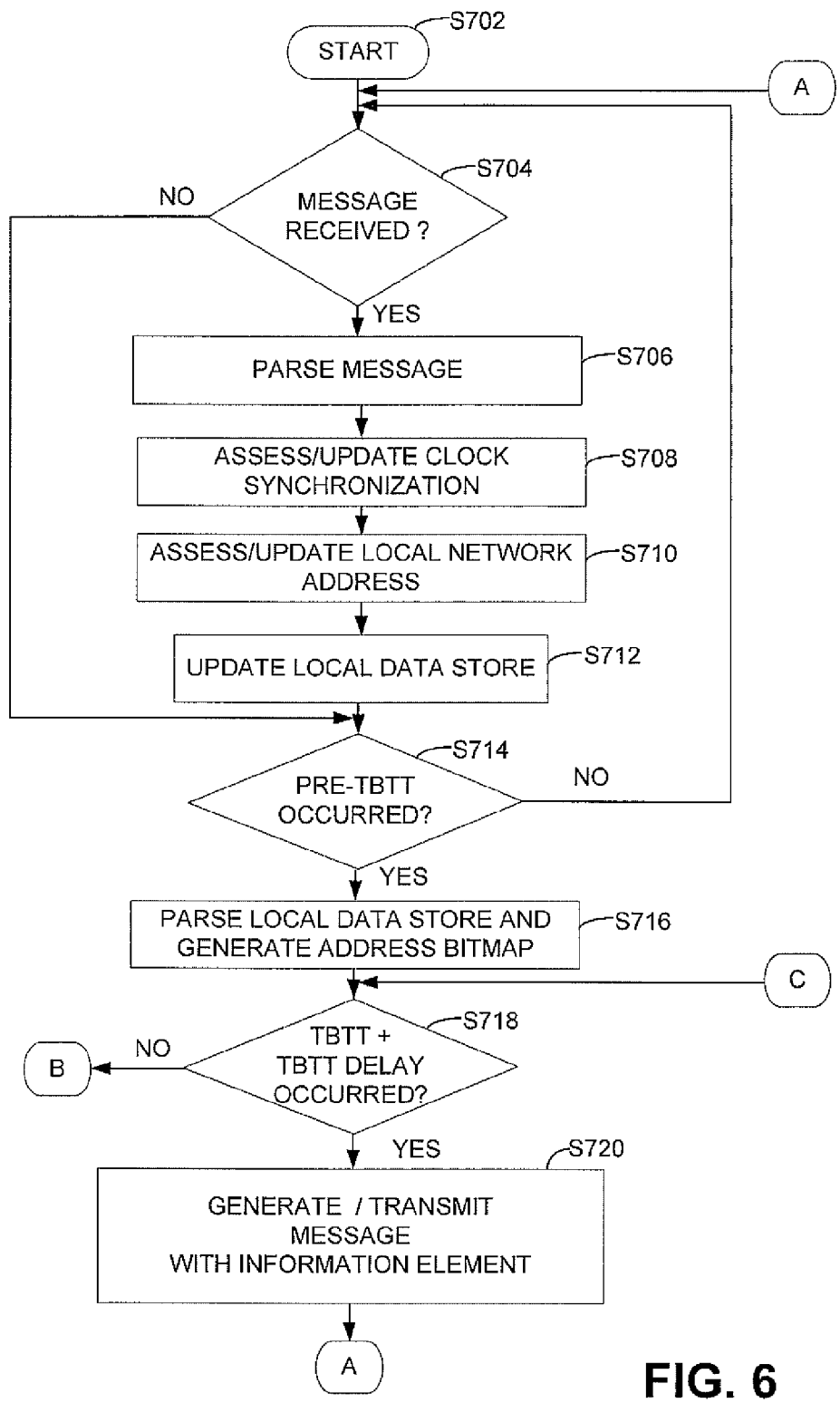
FIG. 6 and FIG. 7 present a flow diagram of an exemplary process executed by a station that supports simplified auto-configuration and service discovery in ad-hoc networks.
Figure 7:
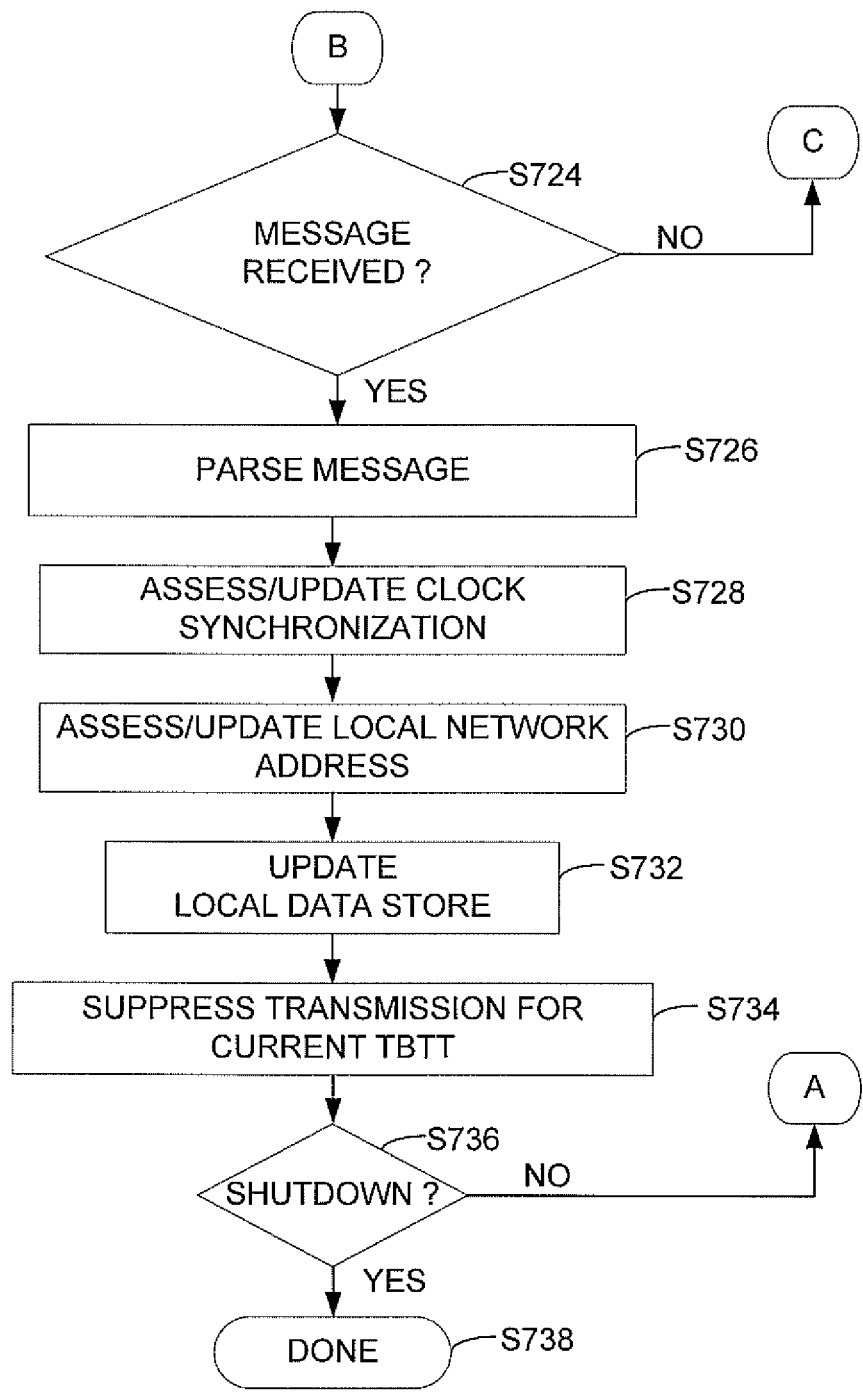

FIG. 6 and FIG. 7 present a flow diagram of an exemplary process that may be used to control operation of a station that that has joined an ad-hoc network that supports simplified auto-configuration and service discovery. The process below assumes that the ad-hoc network, or IBSS, has stabilized and that TBTT and pre-TBTT timeouts are periodically generated by clock control unit 104 based on a clock that is synchronized with peer stations in the ad-hoc network. As shown in FIG. 6, operation of the process may begin at step S702 and processing proceeds to step S704.

In step S704, controller 102 may determine whether a message, e.g., a beacon, probe-request, or probe-response has been received from a peer station. If controller 102 determines that no message has been received, processing proceeds to step S714, otherwise, processing proceeds to step S706.

In step S706, message parsing unit 118 parses the received message to retrieve information contained within, including the information element described above with respect to Table 2, and processing proceeds to step S708.

In step S708, the IBSS timestamp received with the message is compared with the receiving station's IBSS clock time and the received timestamp may be used to update the receiving station's IBSS clock time. For example, if the received timestamp is greater than the receiving station's IBSS clock time, controller 102 may adjust the receiving stations IBSS clock based on the received timestamp. For example, the local IBSS clock time may be updated to a value based on the received timestamp adjusted for internal processing delays and/or transmission time. Once the received timestamp is assessed, and the local IBSS time is either verified or updated, processing proceeds to step S710.

In step S710, the last byte of a transmitting station's selected network address may be assessed to determine whether a network address conflict exists between the receiving station's selected network address and the transmitting station's network address, as described in greater detail with respect to FIG. 8 below, and processing proceeds to step S712.

In step S712, the local data store is updated by local data store unit 112 to reflect information contained in the received message. For example, the local data store may update an existing record to reflect information received in a message, or may create and populate a new record if the message was received from a station from which no messages have previously been received. Further, if a probe-request is received, the local data store may record that a probe-request is outstanding for the station that transmitted the message. In addition, if a probe-response is received that addresses an outstanding probe-request transmitted by the local station or another station, the local data store may be updated reflect that the probe-request has been satisfied and that the probe-request is, therefore, no longer outstanding. Once the local data store is updated in such a manner, processing proceeds to step S714.

In step S714, controller 102 determines whether a pre-TBTT timeout has occurred. If a pre-TBTT timeout has occurred processing proceeds to step S716, otherwise, processing returns to step S704.

In step S716, the controller may instruct network-address bitmap generator 102 to parse local data store unit 112 and to generate a network-address-in-use bitmap, as described above, that indicates which of the available network addresses, e.g., between 0 and 255 have been allocated to stations within the ad-hoc network. As addressed above, the network-address-in-use bitmap may be compressed using any number of allocation strategies and/or compression techniques. Once the network-address-in-use bitmap has been generated, processing proceeds to step S718.

In step S718, controller 102 determines whether a TBTT plus TBTT delay time has occurred. Such a timeout may be determined based on the IBSS TBTT time extended by a random TBTT delay period that may be independently generated by each station in the network based on either a default IBSS beacon contention window, or a shortened contention window selected by a station. For example, the TBTT delay may be randomly generated by each peer station for each subsequent TBTT. In this manner, over a period of time that includes a large number of TBTTs, each peer station will have a statistically equal chance of transmitting a message an equal number of times as other stations in the network. If, in step S718, a TBTT plus TBTT delay timeout has occurred processing proceeds to step S720, otherwise, processing proceeds to step S724.

In step S720, controller 102 may instruct message generating unit 116 to generate and transmit a message, e.g., a beacon, probe-request, probe-response, etc., that includes the information element described above with respect to Table 2. Processing related to determining the type of message to generate and transmit is addressed in greater detail below with respect to FIGS. 10-12. Once a message has been transmitted, processing returns to step S704.

As addressed above, if in step S718 a TBTT plus TBTT delay timeout has not occurred, processing proceeds to step S724. In step S724, controller 102 may determine whether a message has been received from a peer station. If a message has been received from a peer station, processing proceeds to step S726, otherwise processing returns to step S718.

In step S726, step S728, step S730 and step S732, the received message may be parsed, the IBSS clock timing may be assessed and/or updated, the local station's network address may be assessed and/or updated, and the local data store may be updated as described above with respect to step S706, step S708, step S710 and step S712, respectively, and processing proceeds to step 734.

In step S734, controller 102 may update a local control parameter to suppress transmission of a message by the station for the current TBTT. In such an embodiment, only a single station in the ad-hoc network may be allowed to transmit at each TBTT. As addressed above, using such an approach over a period of time that includes a large number of TBTTs, each peer station will have a statistically equal chance of transmitting a message an approximately equal number of times as other stations in network. Once message transmission for the station has been suppressed for the current TBTT, processing may proceed to step 736.

In step S736, if power to the local station is turned off, or if the controller has received an instruction to restart, processing proceeds to step S738 and the process terminates, otherwise, processing returns to step S704, and the process may repeat for another TBTT interval.

Figure 8:
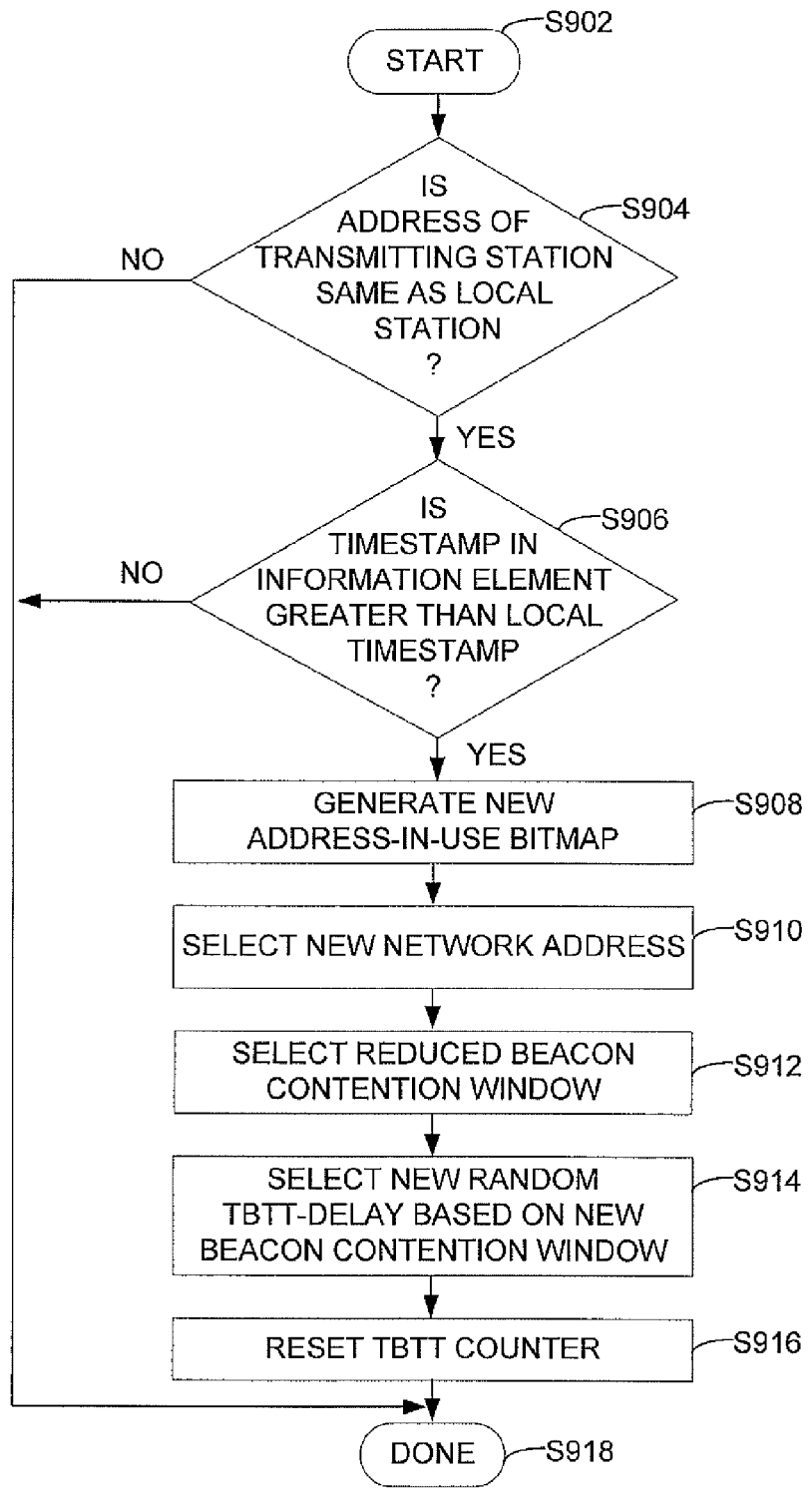
FIG. 8 is a flow diagram of an exemplary process executed by a station to detect and correct a network address conflict.

FIG. 8 is a flow diagram of an exemplary process executed by a station to detect and correct a network address conflict. The process described below with respect to FIG. 8, is referred to above with respect to FIG. 6 at step S710 and step S730, and may be executed to assess the validity of the network address assigned to the local station each time a message from a peer station is received. Such an approach assures that the network address selected by the local station is unique among peer stations connected to the network.

As shown in FIG. 8, operation of the process may begin at step S902 and processing proceeds to step S904.

In step S904, controller 102 may assess the last byte of the network address of a transmitting peer station, as received in the information element included in a message received from the transmitting peer station. If the last byte of the transmitting station's network address matches the last byte of the network address selected by the receiving station, processing proceeds to step S906, otherwise, processing proceeds to step S918 and the process terminates.

In step S906, controller 102 may assess the 4-byte timestamp received in the information element included in the message received from the transmitting peer station. As described above with respect to Table 2, the 4-byte timestamp may represent the number of milliseconds since the transmitting peer station selected the network address. If controller 102 of the receiving station determines that the value in the 4-byte timestamp received in the information element from a peer station is greater than the number of milliseconds since the receiving station selected the network address, processing proceeds to step S908, otherwise processing proceeds to step S918 and the process terminates.

In step S908, controller 102 may instruct address bitmap generator 114 to generate a new network-address-in-use bitmap that includes network-address-in-use bitmap information received in the information element included in the message used to identify the network address conflict, as described above, and processing proceeds to step S910.

In step S910, controller 102 may select a new network address based on the information contained within the updated network-address-in-use bitmap, and processing proceeds to step S912.

In step S912, controller 102 may select a reduced beacon contention window. As described above, reducing the contention window of a station in an ad-hoc network increases the likelihood that a message generated by the station, will be transmitted following upcoming TBTTs. Once the beacon contention window is reduced, processing proceeds to step S914.

In step S914, controller 102 may select a new random TBTT-delay based on the reduced beacon contention window. By reducing the beacon contention window and generating a new random TBTT-delay, the station may increase its chance that a small random TBTT-delay may be selected, and may thereby increase the likelihood that it will be allowed to transmit a message that includes its new network address at an upcoming TBTT. Once a new TBTT-delay is selected, processing proceeds to step S916.

In step S916, controller 102 may reset a TBTT counter to zero. As addressed in greater detail below, the TBTT counter may be incremented each time a TBTT occurs and the local station is using a reduced beacon contention window. Once the contention window has been reduced for a predetermined number of TBTTs, the contention window may be restored to a default IBSS beacon contention window. Once the TBTT counter has been set to zero, processing proceeds to step S918 and the process terminates.

Figure 9:
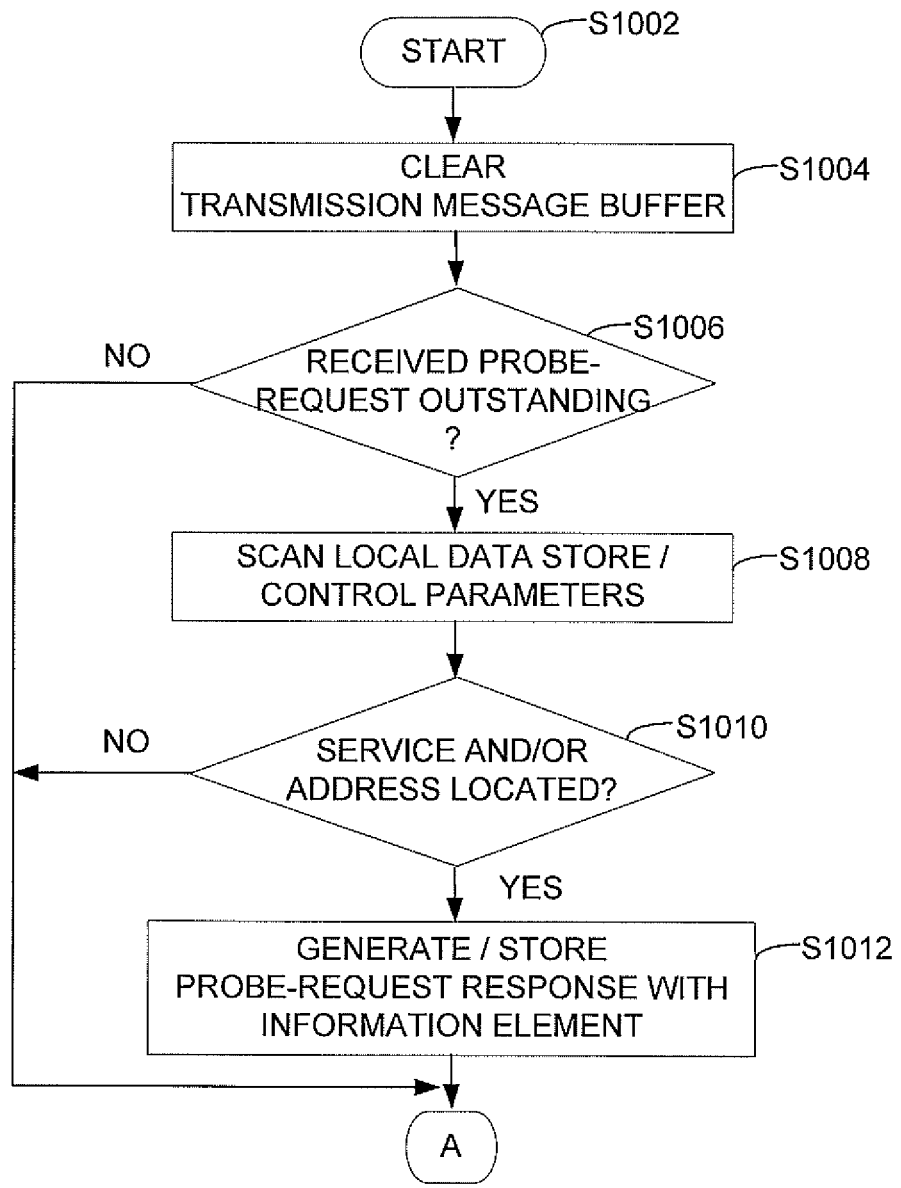
FIG. 9, FIG. 10 and FIG. 11 present a flow diagram of an exemplary process executed by a station to generate one of a beacon, probe-request or probe-response for transmission.
Figure 10:
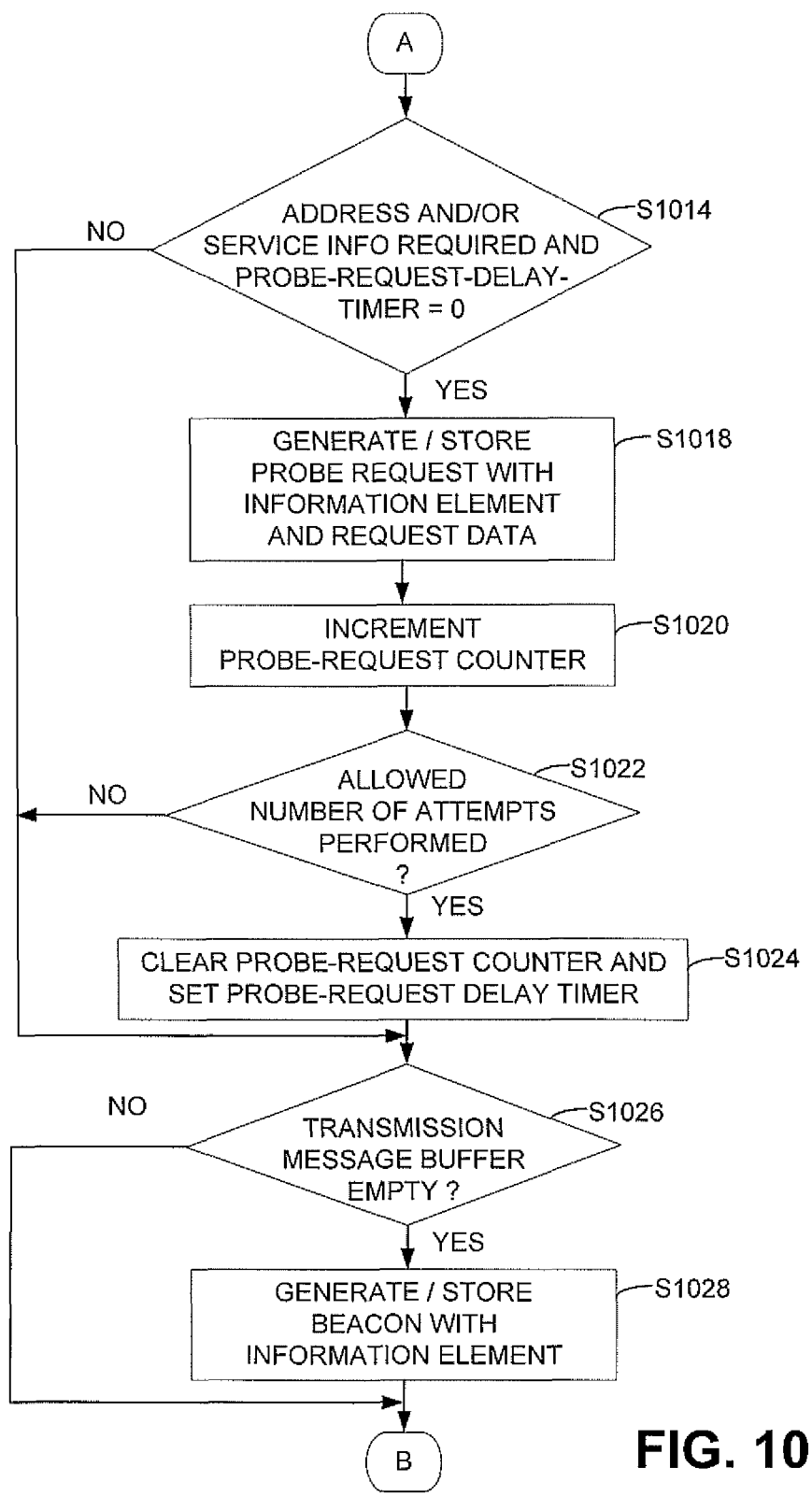
Figure 11:
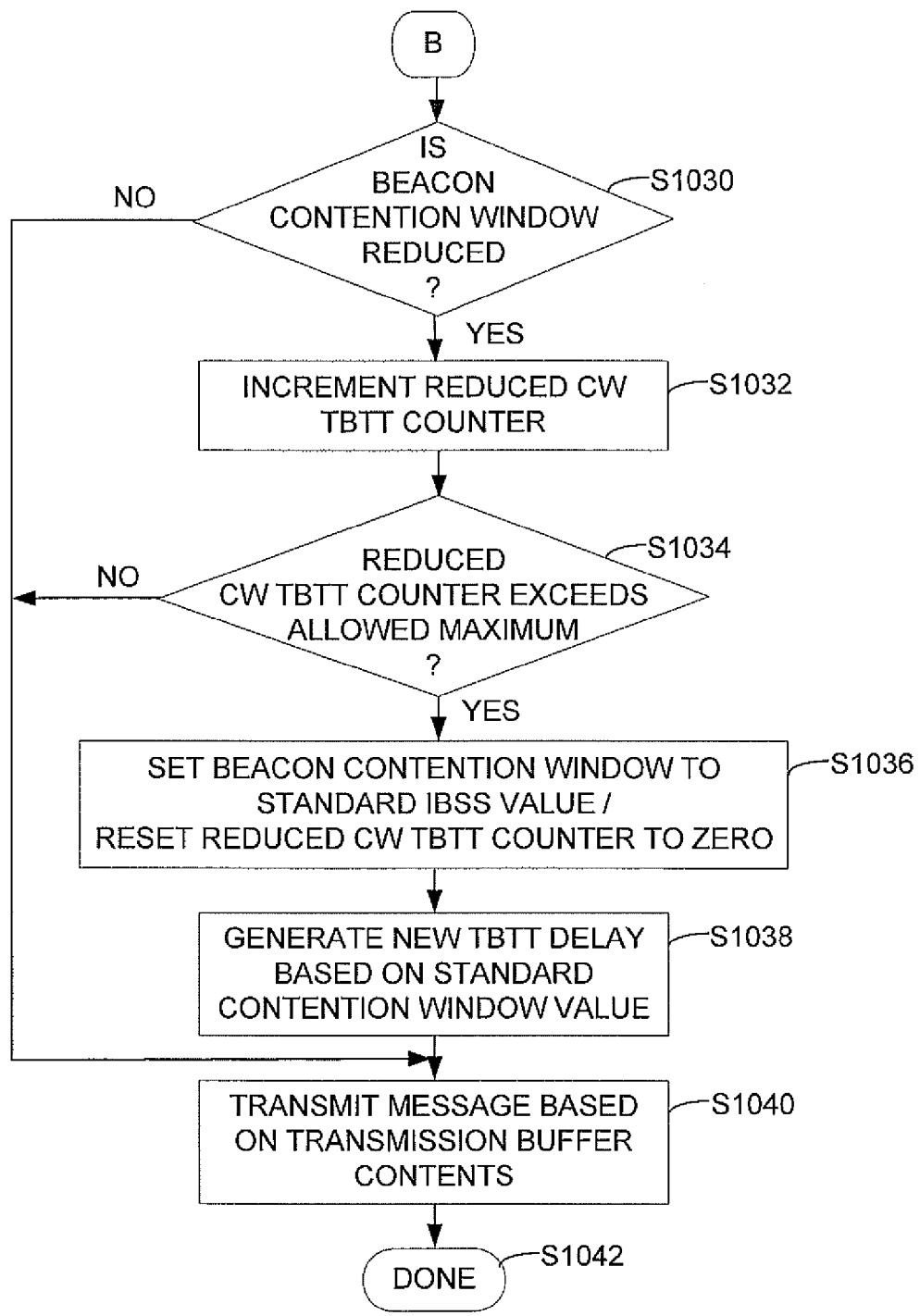

FIG. 9, FIG. 10, and FIG. 11 present a flow diagram of an exemplary process executed by a station to generate a message, e.g., a beacon, a probe-request, a probe-response, etc., for transmission to peer stations in an ad-hoc network. The process described below with respect to FIGS. 10-12 corresponds to processing described above with respect to FIG. 6 at step S720.

As shown in FIG. 9, operation of the process may begin at step S1002 and processing proceeds to step S1004.

In step S1004, controller 102 may instruct message generating unit 116 to clear a transmission message buffer that is used to store components to be included in an outgoing message, and processing proceeds to step 1006.

In step S1006, controller 102 may scan local control parameters and/or may scan the local data store to determine whether a probe-request received from a peer station remains outstanding. If a probe-request is outstanding, processing proceeds to step S1008, otherwise, processing proceeds to step S1014.

In step S1008, controller 102 may scan the local data store, and/or control parameters maintained in volatile memory, to determine whether the local station holds information and/or is capable of providing services and/or information requested by the probe-request, and processing proceeds to step S1010.

If, in step S1010, controller 102 determines that the local station holds information and/or is capable of providing services requested by the probe-request, processing proceeds to step S1012, otherwise processing proceeds to step S1014.

In step S1012, controller 102 may instruct message generating unit 118 to generate a probe-response and to store the generated probe-response within the transmission message buffer. For example, if the probe-request included a list of desired service UUIDs, and the controller determines that the receiving station or a peer station listed in the receiving station's local data store may provide the requested service, the controller may instruct message generating unit 118 to construct a probe-response containing records retrieved from the local data store pertaining to the one or more stations capable of providing the desired service. Similarly, if the probe-request included a list of user-friendly names, and the controller determines that one of the received user-friendly names corresponds to the receiving station or a peer station listed in the receiving station's local data store, the controller may instruct message generating unit 118 to construct a probe-response containing records retrieved from the local data store pertaining to the one or more desired user-friendly names. In such a manner, the receiving station may efficiently provide both a name resolution service and a service discovery service for peer stations of the ad-hoc network. Once the message generating unit 118 has generated the probe-response and stored the generated probe-response within the transmission message buffer, processing proceeds to step S1014.

If, in step S1014, controller 102 determines that a network address of one or more peer stations are needed, and/or determines that a desired service needs to be located within the network, and or decides any other information is required from peer stations that may be addressed by issuing a probe-request, and any probe-request-delay-timer, if previously set, has expired, processing proceeds to step 1018, otherwise, processing proceeds to step S1026.

In step S1018, controller 102 may instruct message generating unit 116 to generate, and store within the transmission message buffer, a probe-request message containing parameters requesting the needed information and the information element described above with respect to Table 2, and processing proceeds to step S1020.

In step S1020, controller 102 may increment a probe-request counter that may be used to track how many times a probe-request has been issued, and processing proceeds to step S1022.

If, in step 1022, controller 102 determines that a predetermined number of probe-requests has been reached, processing proceeds to step S1024, otherwise, processing proceeds to step S1026.

In step S1024, controller 102 may clear the probe-request counter and may set the probe-request delay timer addressed, above with respect to step S1014, to a pre-determined period of time, e.g., 30 seconds. Using such an approach, once the station determines that information is needed and generates a first probe-request, a probe-request may be transmitted up to a predetermined number of times, e.g., 2, 4, 6 or any other integer N, based on a pre-configured default control parameter stored in the station's memory at startup, and/or a user configurable control parameter, and/or based on a shared IBSS control parameter that may be statically determined by the first station in the ad-hoc network, and/or dynamically determined based on information stored in a station's local data store, e.g., based on the number of stations currently in the network. However, if no probe-response is received that addresses the probe-request after a predetermined number of transmission, further probe-requests may be blocked for a period of time in order to allow the station to respond to outstanding probe-requests from peer stations and to allow peer stations a period of time in which to respond to the issued probe-requests. However, after the probe-request delay timer expires, further probe-request messages may be issued based on whatever information is desired by the local station at that time, based on a review of its local data store and/or local control parameters. Once the probe-request counter has been cleared and the probe-request delay timer has been set, processing proceeds to step S1026.

In step S1026, if the controller determines that the transmission message buffer is empty, processing proceeds to step S1028, otherwise, processing proceeds to step S1030.

In step S1028, controller 102 may instruct message generating unit 116 to generate and store in the transmission message buffer, a beacon message that includes the information element described above with respect to Table 2, and processing proceeds to step S1030.

In step S1030, controller 102 may determine whether the local station is operating with a reduced contention window. This may be performed, for example, by either checking a control parameter that indicates whether a reduced contention window has been set, or by comparing the default IBSS beacon contention window to the contention window that is currently in use. If in step S1030, controller 102 determines that a reduced contention window is in use, processing proceeds to step S1032, otherwise processing proceeds to step S1040.

In step S1032, controller 102 may increment a reduced contention window TBTT counter that may be used to track the number of TBTTs that a reduced contention window has used, and processing proceeds to step S1034.

If, in step S1034, controller 102 determines that the reduced contention window TBTT counter is greater than an allowed maximum, processing may proceed to step S1036, otherwise, processing may proceed to step S1040.

In step S1036, controller 102 may set the beacon contention window used by the local station to the default IBSS beacon contention window and may set the reduced contention window TBTT counter to zero, and processing proceeds to step S1038.

In step S1038, controller 102 may generate a new random TBTT delay based on the default IBSS beacon contention window, and processing proceeds to step S1040.

In step S1040, controller 102 may instruct message generating unit 116 to send the contents of the transmission message buffer to network physical layer unit 110 for transmission, and processing terminates at step S1042.

For purposes of explanation, in the above description, numerous specific details are set forth in order to provide a thorough understanding of the described ad-hoc network with simplified auto-configuration and service discovery. It will be apparent, however, to one skilled in the art that the described ad-hoc network with simplified auto-configuration and service discovery may be practiced without these specific details. In other instances, well-known structures and devices are shown in block diagram form in order to avoid obscuring the features of the described ad-hoc network approach.

While the described ad-hoc network with simplified auto-configuration and service discovery has been described in conjunction with the specific embodiments thereof, it is evident that many alternatives, modifications, and variations will be apparent to those skilled in the art. Accordingly, embodiments of the described ad-hoc network with simplified auto-configuration and service discovery as set forth herein are intended to be illustrative, not limiting. There are changes that may be made without departing from the spirit and scope of the invention.

For example, it is to be understood that various functions of the described stations that support embodiments of the described ad-hoc network with simplified auto-configuration and service discovery may be distributed in any manner among any quantity (e.g., one or more) of hardware and/or software modules or units that may be interconnected with circuitry and/or software interfaces.

The described stations that support embodiments of the described ad-hoc network with simplified auto-configuration and service discovery may be integrated within virtually any portable and/or stationary device including, but not limited to, cell phones, personal digital assistants, laptop computers, workstation computers, printers, scanners, network routers and/or other access points to local and/or wide area networks, cameras, child tracking/monitoring devices etc. Further, the described stations may also be integrated within devices such as household/office/factory equipment including, but not limited to, refrigerators, heating and cooling systems, lock mechanisms, fire alarms and/or other security/safety monitoring devices, lighting systems, environmental monitoring systems, etc. The described stations that support embodiments of the described ad-hoc network may be integrated within any device from which a user benefit may be derived by passing information to and/or receiving information from the device.

The described stations that support embodiments of the described ad-hoc network with simplified auto-configuration and service discovery may include any commercially available operating system (e.g., Windows, OS/2, Unix, Linux, DOS, etc.), any commercially available and/or custom software (e.g., communication software, etc.) and any types of input/output devices (e.g., keyboard, mouse, probes, I/O port, etc.).

Control software, or firmware, for the described stations that support embodiments of the described ad-hoc network with simplified auto-configuration and service discovery may be implemented in any desired computer language, and may be developed by one of ordinary skill in the computer and/or programming arts based on the functional description contained herein and illustrated in the drawings. For example, in one exemplary embodiment the described system may be written using the C++ programming language or the JAVA programming language. However, the present invention is not limited to being implemented in any specific programming language or combination of programming languages.

Any software associated with the described stations that support embodiments of the described ad-hoc network with simplified auto-configuration and service discovery may be distributed via any suitable media (e.g., removable memory cards, CD-ROM, tape or other storage media diskette, ad-hoc network connection). Software and/or default control parameters may be installed in any manner (e.g., an install program, copying files, entering an execute command, etc.).

The described stations that support embodiments of the described ad-hoc network with simplified auto-configuration and service discovery may accommodate any quantity and any type of data set files and/or databases or other structures containing stored data in any desired format (e.g., ASCII, plain text, or other format, etc.). The format and structure of internal information structures, such as the described local data stores and control parameters, used to hold intermediate information in support of the described stations may include any and all structures and fields and may include, but are not limited to files, arrays, matrices, status and control booleans/variables.

Further, any references herein to software performing various functions generally refer to computer systems or processors performing those functions under software control. The computer system may alternatively be implemented by hardware or other processing circuitry. The various functions of the described stations that support embodiments of the described ad-hoc network with simplified auto-configuration and service discovery may be distributed in any manner among any quantity (e.g., one or more) of hardware and/or software modules or units, computers or processing systems or circuitry.

From the foregoing description, it will be appreciated that a station that supports embodiments of the described ad-hoc network with simplified auto-configuration and service discovery is disclosed. The described approach is compatible and may be seamlessly integrated within compliant hardware devices.

While a method and apparatus are disclosed that provide a station that supports embodiments of the described ad-hoc network with simplified auto-configuration and service discovery, various modifications, variations and changes are possible within the skill of one of ordinary skill in the art, and fall within the scope of the present invention. Although specific terms are employed herein, they are used in their ordinary and accustomed manner only, unless expressly defined differently herein, and not for purposes of limitation.

What is claimed is:

1. A method performed by a local station to configure the local station to communicate with one or more peer stations, the method comprising:
retrieving, from the local station, a local station network address first portion that is configured to be identical for the local station and a peer station joining dynamically to form an ad-hoc network; and
selecting dynamically a local station network address second portion corresponding to one of a predetermined set of network addresses indicated as unallocated in a peer station bitmap retrieved from a message sent by the peer station.

2. The method of claim 1, further comprising:
receiving the message from the peer station; and
parsing the received message to retrieve a peer station information element, the peer station information element including the peer station bitmap that indicates at least one of allocated and unallocated network addresses within the predetermined set of network addresses.

3. The method of claim 2, further comprising:
generating a local timestamp with information related to a local time at which the local station network address second portion was allocated by the local station.

4. The method of claim 3, wherein the peer station information element further includes:
a peer station network address second portion allocated by the peer station; and
a peer timestamp with information related to a peer time at which the peer station network address second portion was allocated by the peer station.

5. The method of claim 4, further comprising:
receiving at the local station another message from the peer station after the local station has selected the local station network address second portion;
comparing the peer station network address second portion to the local station network address second portion;
determining that the peer station network address second portion is the same as the local station network address second portion;
determining that the peer station network address second portion was allocated by the peer station before the local station network address second portion was allocated by the local station; and
re-selecting a local station network address second portion for the local station corresponding to one of the predetermined set of network addresses indicated as unallocated in the peer station bitmap.

6. The method of claim 5, wherein determining that the peer station network address second portion was allocated by the peer station before the local station network address second portion was allocated by the local station is based on a comparison of the peer timestamp and the local timestamp.

7. The method of claim 2, further comprising:
transmitting another message containing a local station information element, the local station information element including the local station network address second portion and a local timestamp with information related to a local time at which the local station network address second portion was allocated by the local station.

8. The method of claim 7, further comprising:
generating a local station bitmap that indicates at least one of allocated and unallocated network addresses within the predetermined set of network addresses; and
including the generated local station bitmap in the local station information element.

9. The method of claim 8, wherein the generated local station bitmap is based on information included in peer station bitmaps received from the one or more peer stations.

10. A local station that communicates with one or more peer stations, comprising:
a controller that retrieves, from a memory of the local station, a local station network address first portion that is configured to be identical for the local station and a peer station joining dynamically to form an ad-hoc network, the controller selecting dynamically a local station network address second portion corresponding to one of a predetermined set of network addresses indicated as unallocated in a peer station bitmap retrieved from a message sent by the peer station.

11. The local station of claim 10, further comprising:
a physical network unit that receives the message from the peer station; and
a message parsing unit that parses the received message to retrieve a peer station information element, the peer station information element including the peer station bitmap that indicates at least one of allocated and unallocated network addresses within the predetermined set of network addresses.

12. The local station of claim 11, further comprising:
a data store unit that stores the peer station bitmap in association with the peer station.

13. The local station of claim 12, wherein information received from the peer station and stored in the data store unit is deleted when a subsequent message is not received from the peer station within a predetermined period of time.

14. The local station of claim 13, wherein the identifier is a media access control address of the peer station.

15. The local station of claim 11, further comprising:
a clock control unit that generates a local timestamp with information related to a local time at which the local station network address second portion was allocated by the local station.

16. The local station of claim 15, further comprising:
a message generating unit that generates another message including a local station information element, the local station information element including the local station network address second portion and the local timestamp.

17. The local station of claim 16, further comprising:
a bitmap generator that generates a local station bitmap that indicates at least one of allocated and unallocated network addresses within the predetermined set of network addresses based on information contained in the peer station bitmap, the local station information element including the generated local station bitmap.

18. A method performed by a local station to configure the local station to communicate with one or more peer stations via an ad-hoc network, the method comprising:
retrieving, from a memory of the local station, a first portion of a network address for the local station;
receiving a message from a peer station;
parsing the received message to retrieve a peer station information element, the peer station information element including a peer station bitmap that indicates at least one of allocated and unallocated network addresses within a set of network addresses;
selecting a second portion of the network address for the local station corresponding to a network address indicated as unallocated in the peer station bitmap; and
reducing a beacon contention window of the local station for a predetermined number of target beacon transmission times.

19. The method of claim 1, wherein the network address is selected based on the lowest unallocated network address in the peer station bitmap.

20. The local station of claim 10, wherein the network address is selected based on the lowest unallocated network address in the peer station bitmap.

* * * * *